US012657607B2

(12) United States Patent (10) Patent No.: US 12,657,607 B2
Andoni et al. (45) Date of Patent: Jun. 16, 2026

(54) MOBILE DIGITAL ADVERTISING WITH GEOGRAPHIC ENHANCEMENT

(71) Applicants: Peter Andoni, Bloomfield Hills, MI (US); Nick Andoni, Waterford, MI (US); Alex Andoni, Bloomfield Hills, MI (US)

(72) Inventors: Peter Andoni, Bloomfield Hills, MI (US); Nick Andoni, Waterford, MI (US); Alex Andoni, Bloomfield Hills, MI (US)

(73) Assignee: Arkk Food Company, Bloomfield Township, MI (US)

(*) Notice: Subject to any disclaimer, the term of this patent is extended or adjusted under 35 U.S.C. 154(b) by 0 days.

(21) Appl. No.: 18/770,448

(22) Filed: Jul. 11, 2024

(65) Prior Publication Data

US 2025/0104115 A1 Mar. 27, 2025

Related U.S. Application Data

(60) Provisional application No. 63/540,519, filed on Sep. 26, 2023.

(51) Int. Cl.
*G06Q 30/0251* (2023.01)
*G09F 21/04* (2006.01)
*H04W 4/02* (2018.01)

(52) U.S. Cl.
CPC ......... *G06Q 30/0266* (2013.01); *G09F 21/04* (2013.01); *H04W 4/02* (2013.01)

(58) Field of Classification Search
None
See application file for complete search history.

(56) References Cited

U.S. PATENT DOCUMENTS 8,418,386 B1 * 4/2013 Key ........................ G09F 21/04
40/590
8,688,517 B2 * 4/2014 Lutnick .............. G06Q 30/0212
705/14.1

(Continued)

FOREIGN PATENT DOCUMENTS

EP 2026215 A1 * 2/2009 ............. G06Q 30/02
EP 2237251 A1 * 10/2010 ............... B32B 5/22
WO WO-2009023654 A1 * 2/2009 ......... G06Q 30/0272

OTHER PUBLICATIONS

LiveDesign. Art on the MART: World's Largest Permanent Projection Mapping System. (Nov. 29, 2018). Retrieved online Oct. 23, 2021. https://www.livedesignonline.com/excellence-installation-awards/art-themart-world-s-largest-permanent-projection-mapping-system (Year: 2018).*

(Continued)

*Primary Examiner* — James A Reagan
(74) *Attorney, Agent, or Firm* — Bodman PLC

(57) ABSTRACT

A digital advertising system includes a vehicle and a processor that operates a digital display. The processer is integrated with the vehicle and is programmable with a plurality of digital messaging. The vehicle includes a geographic locating device. The processor is programmed to display digital messaging on the digital display. The geographic locating device identifies proximity to a location of interest and the processor is programmed to signal the digital message to initiate display of digital messaging such as advertising that is unique to the location of interest based upon proximity of the vehicle to the location of interest.

10 Claims, 2 Drawing Sheets

(56) References Cited

U.S. PATENT DOCUMENTS

| | | | | |
|---|---|---|---|---|
| 8,934,062 | B1* | 1/2015 | Bosarge | B60R 11/0235 |
| | | | | 348/837 |
| 9,135,842 | B1* | 9/2015 | Riley | G09F 21/048 |
| 9,183,572 | B2* | 11/2015 | Brubaker | G06Q 30/02 |
| 9,990,644 | B2* | 6/2018 | Walden | H04W 4/029 |
| 10,433,106 | B2* | 10/2019 | Sahadi | H04L 67/52 |
| 10,438,141 | B2* | 10/2019 | Sahadi | G06Q 50/14 |
| 10,567,909 | B2* | 2/2020 | Singh | G06Q 30/0252 |
| 10,636,335 | B2* | 4/2020 | Kis-Benedek Pinero | |
| | | | | G09F 21/04 |
| 10,715,972 | B2* | 7/2020 | van de Poll | G06V 40/172 |
| 10,740,796 | B2* | 8/2020 | Brubaker | G09F 9/30 |
| 10,755,613 | B2* | 8/2020 | Brubaker | B60R 13/10 |
| 10,783,559 | B1* | 9/2020 | Tran | H04W 4/40 |
| 11,030,599 | B2* | 6/2021 | Fernandez | G06Q 30/0261 |
| 11,080,753 | B2* | 8/2021 | Cho | G09F 21/04 |
| 11,308,519 | B2* | 4/2022 | Ryu | G01S 19/13 |
| 11,748,778 | B2* | 9/2023 | Badenhop | H04L 67/53 |
| | | | | 705/14.58 |
| 11,836,760 | B1* | 12/2023 | Gerrese | G06Q 30/0266 |
| 2002/0167416 | A1* | 11/2002 | Polyakov | H04L 67/53 |
| | | | | 340/7.55 |
| 2003/0006911 | A1* | 1/2003 | Smith | G06Q 30/0239 |
| | | | | 705/14.66 |
| 2008/0109317 | A1* | 5/2008 | Singh | G06Q 30/0254 |
| | | | | 705/14.5 |
| 2009/0167559 | A1* | 7/2009 | Gaddy | G08G 1/0962 |
| | | | | 340/901 |
| 2009/0240590 | A1* | 9/2009 | Or | G06Q 30/0267 |
| | | | | 705/14.63 |
| 2009/0299857 | A1* | 12/2009 | Brubaker | G06Q 30/02 |
| | | | | 455/99 |
| 2012/0303458 | A1* | 11/2012 | Schuler, Jr. | G06Q 30/0266 |
| | | | | 705/14.62 |
| 2014/0040016 | A1* | 2/2014 | Amla | G06Q 30/0267 |
| | | | | 705/14.63 |
| 2014/0188614 | A1* | 7/2014 | Badenhop | G06Q 30/0261 |
| | | | | 705/14.58 |
| 2014/0316900 | A1* | 10/2014 | Amla | G06Q 30/0266 |
| | | | | 705/14.63 |
| 2016/0371735 | A1* | 12/2016 | Walden | H04W 4/80 |
| 2017/0140683 | A1* | 5/2017 | Wright | G06F 3/147 |
| 2017/0178104 | A1* | 6/2017 | Fernandez | G06Q 30/0281 |
| 2017/0200197 | A1* | 7/2017 | Brubaker | B60Q 1/2619 |
| 2017/0228776 | A1* | 8/2017 | Walden | G06Q 30/0261 |
| 2018/0047057 | A1* | 2/2018 | Mayfield | G09F 21/026 |
| 2018/0160282 | A1* | 6/2018 | van de Poll | H04W 4/029 |
| 2018/0253805 | A1* | 9/2018 | Kelly | G06Q 50/12 |
| 2018/0315359 | A1* | 11/2018 | Jo | G09F 27/00 |
| 2018/0349808 | A1* | 12/2018 | Sahadi | G06Q 10/047 |
| 2018/0352373 | A1* | 12/2018 | Sahadi | H04W 4/021 |
| 2018/0374127 | A1* | 12/2018 | Walden | G06Q 30/0242 |
| 2019/0095454 | A1* | 3/2019 | Sahadi | G06F 16/9537 |
| 2019/0132815 | A1* | 5/2019 | Zampini, II | G06Q 50/06 |
| 2019/0213931 | A1* | 7/2019 | Brubaker | B60Q 1/2607 |
| 2019/0266638 | A1* | 8/2019 | Bastide | G06Q 30/0267 |
| 2019/0266643 | A1* | 8/2019 | Cho | G08G 1/22 |
| 2020/0058054 | A1* | 2/2020 | Ryu | H04W 4/23 |
| 2020/0107064 | A1* | 4/2020 | Shafai | H04N 21/41415 |
| 2020/0402106 | A1* | 12/2020 | Manicka | H04W 4/23 |
| 2021/0065241 | A1* | 3/2021 | Chakravarty | G06Q 30/0261 |
| 2021/0201354 | A1* | 7/2021 | Maliszewski | G06Q 50/40 |
| 2021/0201356 | A1* | 7/2021 | Ta | G06Q 30/0267 |
| 2022/0101381 | A1* | 3/2022 | Terzian | G09F 21/048 |
| 2023/0306468 | A1* | 9/2023 | Andersen | H04W 4/025 |

OTHER PUBLICATIONS

Florian Alt. A Design Space for Pervasive Advertising on Public Displays. (Jul. 12, 2012). Retrieved online Aug. 13, 2020. https://pdfs.semanticscholar.org/4bef/aba88eb1d14e81dcd610658bccbbf287b770.pdf (Year: 2012).*

Ben Coxworth. Truck-mounted billboards morph with the miles. (Sep. 12, 2016). Retrieved online Aug. 13, 2020. https://newatlas.com/roadads-eink-truck-billboards/45380/ (Year: 2016).*

Technoframe. LED Bus Screens. (Nov. 18, 2011). Retrieved online Aug. 13, 2020. https://technoframe.com/led-bus-screens (Year: 2011).*

Jingbin Liu et al. iParking: An Intelligent Indoor Location-Based Smartphone Parking Service. (Oct. 31, 2012). Retrieved online Aug. 26, 2020. https://www.ncbi.nlm.nih.gov/pmc/articles/PMC3522932/ (Year: 2012).*

Ted Morris et al. A Comprehensive System for Assessing Truck Parking Availability Final Report. (Jan. 2017). Retrieved online Aug. 26, 2020. https://www.dot.state.mn.us/ofrw/PDF/assessing-truck-parking.pdf (Year: 2017).*

Mateusz Jozef Kulesza. E-Park: Automated-Ticketing Parking Meter System. (Apr. 2, 2015). https://dash.harvard.edu/bitstream/handle/1/17417570/KULESZA-SENIORTHESIS-2015.pdf?sequence=1&isAllowed=y (Year: 2015).*

* cited by examiner

MOBILE DIGITAL ADVERTISING WITH GEOGRAPHIC ENHANCEMENT

PRIOR APPLICATIONS

The present application claims priority to U.S. provisional patent Application No. 63/540,519 filed on Sep. 26, 2023.

TECHNICAL FIELD

The present invention relates generally toward digital advertising. More specifically, the present invention relates toward digital advertising on a vehicle with geographic enhancement.

BACKGROUND

Recently, advertising has been revolutionized through the advent of digital billboards and the like. Further, digital advertising has been installed on vehicles such as, for example, on flatbed trailers having large digital video screens and occasionally on box trailers and delivery trucks. Use of digital advertising provides the ability for flexible messaging and includes frequent changes of advertisements. While these digital advertising methods provide mobile messaging, targeting specific groups to improve effectiveness of the messaging is not necessarily improved merely by providing mobility.

Optimal targeting of interested consumers has not been fully recognized. Therefore, it would be advantageous to introduce more effective advertising that targets consumers capable of purchasing the goods and services being advertised.

SUMMARY

A mobile digital messaging system includes a vehicle having a digital display for displaying digital images. In one embodiment, the digital messaging is digital advertising for local businesses or other specific locations of interest, such as, for example, government offices, public parks and churches. A processer is integrated with the vehicle and is programmable with a plurality of digital messaging. The vehicle includes a geographic locating device. The processor is programmed to display digital messaging on the digital display. The geographic locating device identifies proximity to a location of interest and the processor is programmed to signal the digital message to initiate display of digital messaging such as advertising that is unique to the location of interest based upon proximity of the vehicle to the location of interest.

Many businesses depend on walk in traffic for purchasers of goods and services. Often, the business is not of primary interest to a potential customer when that customer is in proximity to the business. Timely placed advertisements that are in proximity to the business provide the ability to peak interest of those that are proximate the business. Digital messaging on vehicles prompted by proximity to a business provide a unique ability to timely provide digital messaging increasing awareness of the business to a potential customer. A vehicle outfitted with the digital messaging of the present inventive system is programmable with multiple layers of messaging driven by proximity to a business making use of the system. The digital messages are triggered by proximity to the business. The digital messaging may change several times even while the vehicle is driven along a single street as proximity to various businesses change while the vehicle travels. In one embodiment, digital messaging display time increases when the vehicle becomes closer to a business purchasing the messaging or advertising.

BRIEF DESCRIPTION OF THE DRAWINGS

Other advantages of the present invention will be readily appreciated as the same becomes better understood by reference to the following detailed description, when considered in connection with the accompanying drawing, wherein.

DETAILED DESCRIPTION

Figures 1, 2:
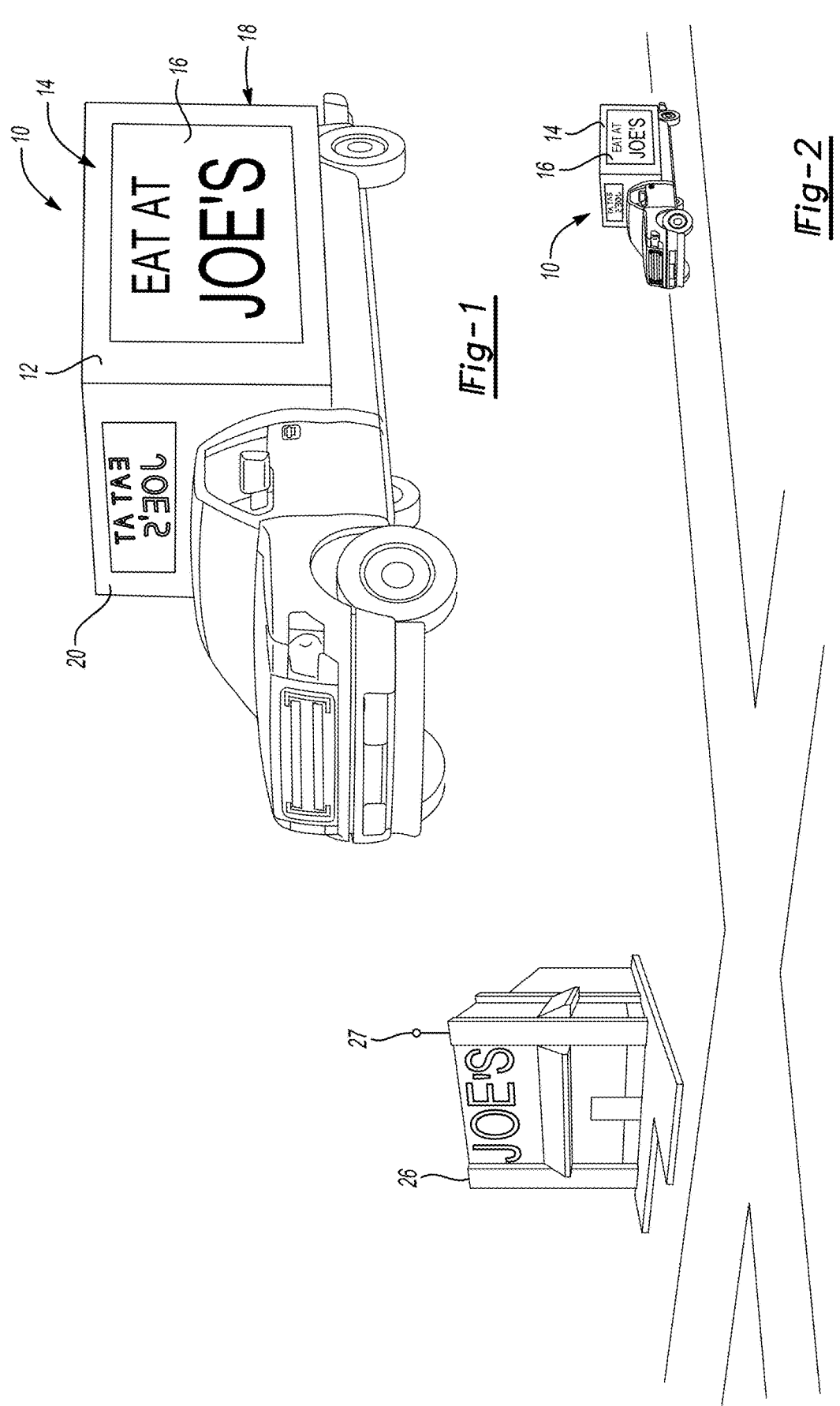
FIG. 1 shows the vehicle of the present invention showing the digital advertising medium.
FIG. 2 shows a first environmental view of the system of the present invention with the vehicle traveling on a roadway.

Referring to FIG. 1, a vehicle of the present invention is generally shown at 10. The vehicle 10 includes a trailer 12 or box used for delivering goods and products to a destination. The trailer 12 includes a flat surface 14 upon which a digital display 16 is mounted. The display 16 is mountable on any surface of the trailer 12, including on driver and passenger sides of the trailer 12 and rear 18 and forward 20 surfaces of the trailer 16. In one embodiment the display mounted on the forward surface 20 is a mirror image of the images shown on the other surfaces of the trailer so that a vehicle operator may observe the images shown on the forward surface 20 in a rear-view mirror. The digital display 16 may take the form of a light emitting diode (LED) display, a liquid crystal display or any other electronic form capable of generating a digital image.

A processor 22 is located on the vehicle 10 and is electronically connected to the electronic display 16. The processor 22 is programmed with digital messaging that is digital advertising and or other messaging that is represented on the digital display 16. While "messaging" and "imaging" are used throughout this application, it should be understood to those of skill in the art that these concepts include advertising, public service announcements, and any digital conveyance that visible messaging provides information to the public. The digital imaging may be inanimate messaging or motion images such as, for example, video advertising. It should be understood that any form of digital messaging or imaging is within the scope of this invention. It should be further understood that monetization of the digital imaging is achievable by selling messaging time on the display 16 to third parties in which third party defined content is shown on the digital display 16.

Figure 3:
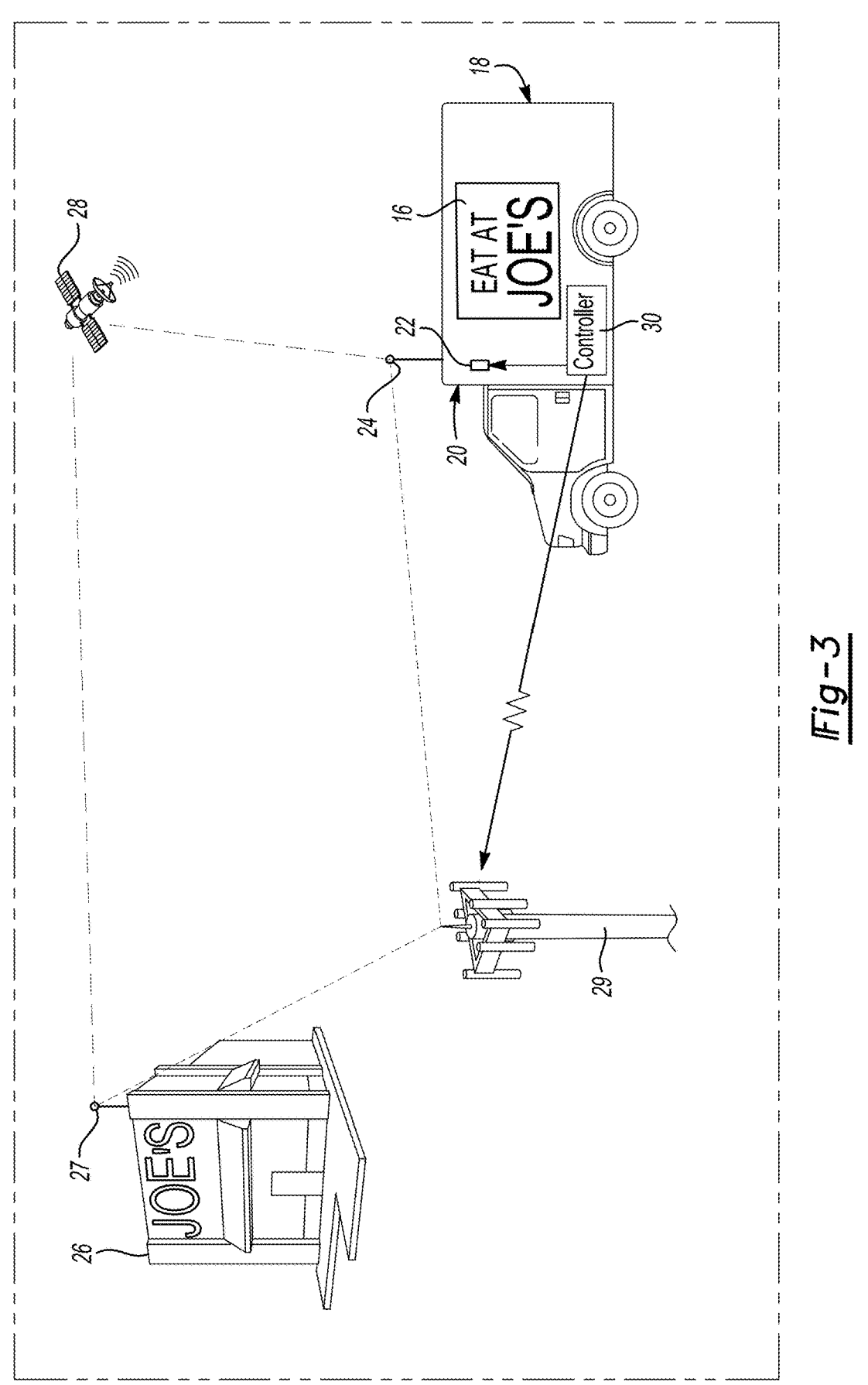
FIG. 3 shows and alternative environmental view of the system representing the communication network used to implement digital messaging.

In one embodiment the vehicle includes a receptor/transmitter 24 that takes the form of an antenna or satellite dish as best represented in FIG. 3. As used herein, an antenna is shown. However, any form of analog or digital communication system may be used including but not limited to cellular, Bluetooth, satellite signaling, and the like. Broad band cellular transmission is also within the scope of the present invention. The receptor/transmitter 24 may also be used to track and locate the vehicle 10 While a receptor/transmitter 24 is represented, it should be understood that location the vehicle 10 is determined, in one embodiment, merely by way of conventional GPS as will be explained further hereinbelow and that a designated receptor/transmitter would not be required.

Still further, cellular systems alone may be used for tracking location of the vehicle 10 and providing location determined messaging as best represented in FIG. 3. In this embodiment, a cellular tower 29 is used to determine location of the vehicle 10 to a location of interest in a known manner. Alternatively, a combination of GPS and cellular systems may be combined for tracking location of the vehicle 10 providing location determined messaging. In this embodiment, the satellite 28 shown in FIG. 3 and the cellular tower 29 shown in FIG. 3 work together track movement of the vehicle 10 to trigger proximity determined messaging.

The processor 22 is programmed with proximity information of third-party advertisers. For example, the processor is programmed for identifying proximity to a third-party facility, in this non-limiting embodiment a shop 26. When the vehicle 10 is disposed within a predefined proximity to the shop 26, the processor 22 changes the content of the digital display 16 to content particular to the shop 26. For example, the when the vehicle is located within a range of one-half mile of the shop 26, the digital display 16 displays content particular to the shop. This could be advertising specific to the goods or services the shop 26 provides to customers. Discounts, special sales and new or clearance products may all be advertised on the digital display 16 when the vehicle 10 is disposed within a predefined range of the shop 26.

The processor 22 may take the form of a smart phone or tablet. Many smart phones and tablets include GPS systems along with standard cellular electronics. Thus, the processor communicates with the display 16 via Bluetooth or equivalent wireless communication. In this embodiment, the processor 22 may receive wireless transmission of messaging via a cellular network from a controller 30 located at a remote location. The messaging may be transmitted periodically while the vehicle 10 is in motion enabling rapid or real time uploading of messaging content to the processor 22. Alternatively, the digital messaging is downloaded to the processor 22 prior to the vehicle 10 beginning its travel.

In one embodiment, the digital advertising particular to the shop 26 increases in frequency as the vehicle 10 approaches closer proximity to the shop 26. Alternatively, the digital advertising becomes the sole digital messaging when the vehicle 10 is within a predefined range to the shop 26. Advertising by the shop 26, in one embodiment, is made in real time. For example, the shop 26 may be experiencing slow sales of a particular good. Purveyors at the shop 26 accesses a website and upload special pricing or sale of the good. The uploaded information is immediately signaled by the controller 30 to the processor 22 on the vehicle and thusly shown on the digital display 16.

Location of the vehicle 10 is identified by any method used to identify geometric location of an object. In one embodiment, geometric location is identified by global positioning satellite (GPS) 28 in a known manner. The processor 22 is programmed with the geographic location of the shop 26 via GPS software saved on the processor 22. Upon approaching the predetermined range to the shop 26 the GPS software is triggered by a GPS satellite signal 28 to initiate digital imaging purchased by the shop 26 in a manner set forth above. Alternatively, the shop 26 includes a shop transmitter/receiver 27 that transmits and receives signals via the cell tower 19, the satellite 28 or directly via land line to the controller 30 or processor 22. However, the shop transmitter/receiver 27 need only access one of these for the purpose of communicating with the processor 22 or the controller 30 and the shop transmitter/receiver 27 shown in the Figures is merely exemplary. However, it should be understood by those of skill in the art that location of the shop 26 is known through conventional geo locating applications that make use of GPS such as, for example, Google® Maps or Waze®. In this manner, the vehicle processor 22 calculates proximity of the vehicle 10 relative to the shop 26 for proximity directed messaging as is explained further hereinbelow.

Alternative geometric position systems may be used to determine proximity of the vehicle 10 to the shop 26. For example, cellular locating may be used. This may be particularly useful in urban areas where satellite 28 transmission may be blocked. In this embodiment, location of the vehicle 10 is determined by way of cellular towers 29 transmitting to the processor 22 via the receptor/transmitter 24. In a manner similar to that set forth above, messaging on the digital display 16 is changed to be particular to the shop 26 at a predetermined range to the shop. Alternatively, the shop 26 includes a shop transmitter/receiver 27 that transmits and receives signals via the cell tower 19, the satellite 28 or directly to the controller 30 or processor 22. The shop transmitter/receiver 27 can take the form of a cellular enabled smartphone, or wireless internet service.

Digital messaging may take a different form on, for example, long haul trucks and trailers that drive primarily on highways. In this embodiment the display 16 is contemplated to be triggered by proximity to a highway exit. Proximity range to an exit may be triggered miles before the exit to provide enough time for an observer to exit the highway. In this embodiment, a single or a plurality of businesses 26 may be identified as being accessible at a predetermined highway exit. When a plurality of businesses subscribe to the digital messaging associated with a highway exit, the messaging may be displayed periodically for each subscribing business, or subject to a group advertisement on a single message. In either instance, messaging is increased as the vehicle 10 becomes more proximate to the highway exit.

It is contemplated that more than one business having subscribed to the messaging services may be located proximate to each other. In this instance, the messaging on the display 16 may be periodic between the two businesses. Thus, the messaging on the display 16 alternates between the two businesses on an increasing interval while other messaging correlated with a location of interest further away may be displayed at decreasing intervals.

It should be understood that combinations of GPS, cellular and equivalent systems may be implemented to improve proximity awareness of the vehicle 10 to various purchasers of messaging on the digital display 16. As disclosed above, the vehicle 10 processor 22 may interact with the satellite 28 while moving in open spaces while interacting with the cellular tower 29 when moving within a city where the satellite 28 signal may be blocked. Alternatively, GPS may be used as primary determinative to location of the vehicle 10 while cellular systems may be used to update messaging and advertising. Thus, the system of the present invention need not rely on both cellular and GPS but may make use of only one of these devices for communicating with the controller 30 and identifying proximity to a shop 27.

Signaling between the shop 26 and the processor 22 on the vehicle 10 may also be achieved by way of the same combinations to enable real time implementation of messaging. For example, the shop 26 (or other business)

accesses the remote controller 30 via the webpage with specific advertising. The controller 30 is programmed to link the advertising with a location of interest, likely the address of the shop 26. In this embodiment, the controller 30, via the cell tower 29, or alternatively the satellite 28 signals the processer 22 to download the geometric location of interest and the advertising. Once downloaded to the processor 22, the messaging works as disclosed hereinabove.

Public service messaging may also be displayed in real time based upon proximity. For example, proximity of the vehicle 10 to an accident or other emergency could trigger real time public service messaging to avoid the area, seek alternate routes or seek shelter. In this embodiment, a police station having been notified of an accident signals the controller 30 with location and other relevant details. The controller 30, after having processed the received information signals the processor 22 via the satellite 28 and cellular tower 29 public service messaging and that is linked to the location of the accident so that the vehicle 10 within a predetermined range of the accident automatically transmits the public service announcement advising other drivers to avoid the area or seek an alternative route.

The invention has been described is in an illustrative manner; many modifications and variations of the present invention are possible in light of the above teachings. It is therefore to be understood that within the specification, the reference numerals are merely for convenience, and are not to be in any way limiting, and that the invention may be practiced otherwise than is specifically described. Therefore, the invention can be practiced otherwise than is specifically described within the scope of the stated claims following this first disclosed embodiment.

What is claimed is:

1. A mobile digital advertising system, comprising:
a vehicle including a digital display for displaying digital content, said digital display being located on a plurality of sides of a trailer or box car of said vehicle;
a processor being integrated with said vehicle and being accessible to a plurality of digital content;
said vehicle including a geographic locating device configured to identify a location of the vehicle while said vehicle travels on a roadway and being electronically interconnected with said processor for signaling said processor the location of the vehicle;
said processor being adapted to receive digital content in real time from either of a first subscriber business or a second subscriber business;
said digital display displaying digital content in real time relative to the location of the vehicle to the first subscriber business and the second subscriber business while the vehicle is travelling on the roadway;
said processor being electronically interconnected to said digital display for directing display of the digital content on said digital display based upon location of the vehicle traveling on the roadway; and
said geographic locating device identifying proximity to a geographic location of the first subscriber business and the second subscriber business and said processor signaling said digital display to periodically modify display of digital content unique to one of the first subscriber business and the second subscriber business relative to the geographic location at intervals being based upon a change in said vehicle's proximity to the geographic location of the first subscriber business and the second subscriber business.

2. The mobile digital advertising system set forth in claim 1, wherein said digital display comprises at least one of a light emitting diode and a liquid crystal display.

3. The mobile digital advertising system set forth in claim 1, wherein said geographic locating device comprises at least one of a GPS system, a cellular system, and a proximity sensor.

4. The mobile digital advertising system set forth in claim 1, wherein said display is generated in real time from a purchaser of advertising.

5. The mobile digital advertising system set forth in claim 1, wherein said processor disposed on said vehicle is electronically connected to said display via wired or wireless connection.

6. The mobile digital advertising system set forth in claim 1, wherein proximity range of said vehicle to the geographic location triggering said digital display is predefined.

7. The mobile digital advertising system set forth in claim 1, wherein said processor is disposed in wireless communication with the geographic location processor for receiving real time informational content.

8. The mobile digital advertising system set forth in claim 1, wherein said geographic location includes a first locus and a second locus.

9. The mobile digital advertising system set forth in claim 8, wherein said processor interchanges a first digital display and a second digital display when location of said vehicle is proximate to both said first locus and said second locus.

10. The mobile digital advertising system set forth in claim 9, wherein said processor increases frequency of at least one of said first digital display and said second digital display based upon proximity to one of said first locus and said second locus.

* * * * *